United States Patent [19]

Rivero-Olmedo

[11] Patent Number: 4,809,548

[45] Date of Patent: * Mar. 7, 1989

[54] METER BOXES AND MOUNTINGS THEREFOR

[76] Inventor: Jose M. Rivero-Olmedo, Ocean Park 9 Atlantic Place St., Santurce, P.R. 00911

[*] Notice: The portion of the term of this patent subsequent to Jun. 2, 2004 has been disclaimed.

[21] Appl. No.: 34,046

[22] Filed: Apr. 6, 1987

Related U.S. Application Data

[63] Continuation-in-part of Ser. No. 781,785, Sep. 30, 1985, Pat. No. 4,669,305.

[51] Int. Cl.$^4$ .............................................. G01F 15/18
[52] U.S. Cl. ........................................ 73/201; 285/30; 251/904
[58] Field of Search ......................... 73/201, 273, 431; 137/364, 365, 371; 285/30; 251/309, 904

[56] References Cited

U.S. PATENT DOCUMENTS

| | | | |
|---|---|---|---|
| 2,018,615 | 10/1935 | Lofton | 73/201 |
| 2,165,626 | 7/1939 | Ford | 285/30 |
| 3,212,339 | 10/1965 | Olmedo | 73/431 |
| 3,434,330 | 3/1969 | Ingham et al. | 73/431 |
| 3,765,249 | 10/1973 | Bissell | 73/431 |
| 3,788,599 | 1/1974 | Cloyd | 251/309 |
| 3,913,400 | 10/1975 | Floren | 73/273 |
| 4,136,515 | 1/1979 | Thompson et al. | 73/201 |
| 4,207,923 | 6/1980 | Giurtino | 251/309 |
| 4,669,305 | 6/1987 | Olmedo | 73/201 |

Primary Examiner—John Chapman
Attorney, Agent, or Firm—Lalos & Keegan

[57] ABSTRACT

A meter box including a bottom tray having a floor, side walls, a collar releasably connected to the top of said tray, and a lid releasably connected to the top of the collar. All of the parts fit together and are releasably secured in this position without the need for nuts and bolts or the like. Also, except for removal of the lid, the parts may be connected and disconnected without the need for tools. The inlet valve is also releasably secured in place and may be assembled and disassembled from the remainder of the meter box without the use of tools.

16 Claims, 5 Drawing Sheets

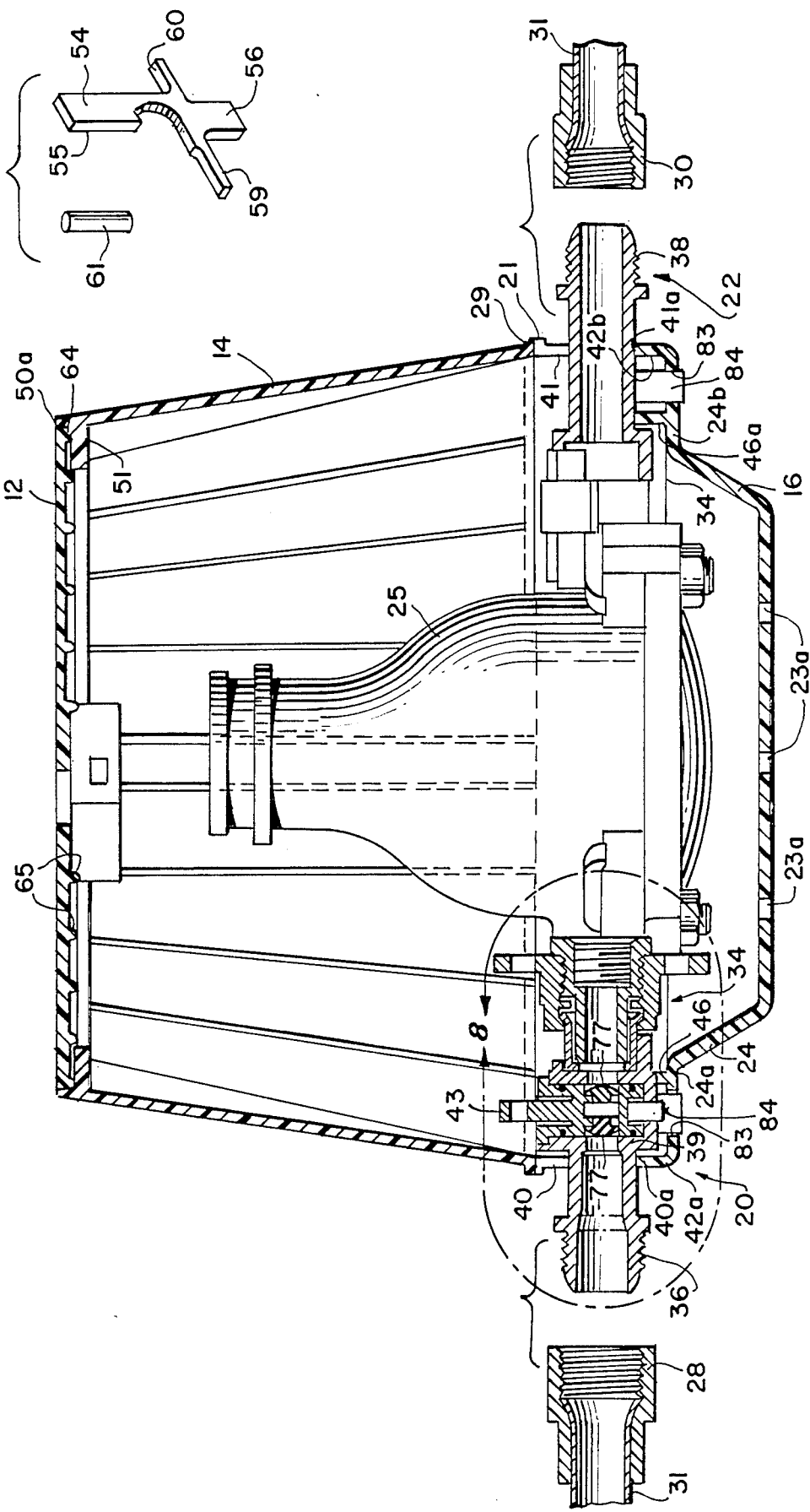

4,809,548

METER BOXES AND MOUNTINGS THEREFOR

CROSS REFERENCE TO RELATED APPLICATIONS

The present application is a continuation-in-part (CIP) of copending application Ser. No. 781,785, filed Sept. 30, 1985, for Meter Box, by the same inventor, now U.S. Pat. No. 4,669,305 issued on June 2, 1988.

BACKGROUND OF THE INVENTION

The present invention relates to meter boxes and mountings for fluid meters. It more particularly relates to meter boxes for water meters of the type to be installed outdoors flush with the surface of the ground. It further relates to the construction of such meter boxes.

In the past, there have been numerous constructions of meter boxes. Examples are U.S. Pat. Nos. 3,913,400 to Floren, 3,443,436 to Meyer, 3,212,339 to Rivero, 2,619,837 to Ford, 2,018,615 to Lofton, and 1,169,976 to Lofton. Typically these were made from a heavy cast iron design. To assemble the meter in the meter box was a complicated process requiring the installation (usually with nuts and bolts) of the inlet and outlet fittings to the box, the hook-up of the meter to the one fitting, and the hook-up of the meter at its other end to an expansion mechanism which was attached to the other fitting. It was also necessary to secure the middle or collar portion of the box to the bottom tray through a complicated and time consuming bolt and nut assembly. Since the fittings were separate from the mounting box itself, relative movement was frequent and fittings would become misaligned with the meter. Leaking of the fluid was occurring between the recess of the inlet valve and the expansion mechanism and between the meter and the recess of the outlet fitting.

In the copending application, Ser. No. 781,785 filed Sept. 30, 1985, for Meter Box, Inventor Jose Rivero, now U.S. Pat. No. 4,669,305, issued June 2, 1987, a meter box is described which has the fittings as part of the meter box and there is assembly without the need for nuts and bolts which had heretofore been needed. However, this device did not cure all of the difficulties encountered in meter boxes, such as the cost of construction of the molds to produce the bottom tray part of the box, due to its complicated structure. Further, when the fitting wears because of use, the whole bottom of the box has to be replaced.

BRIEF SUMMARY OF THE INVENTION

Therefore, it is an object of the present invention to provide a meter box which may be easily assembled and disassembled on site in a simple manner.

Another object of the invention is to provide a lockable lid on a meter box which can only be removed with a special key so that unauthorized persons may not obtain access to the interior of the meter box.

The present invention does this in a simple manner so that after the key has been used and the lid removed, the collar, which is releasably secured to the bottom tray, may be removed without the need for any tools whatsoever.

A further object of the invention is to provide a valve which may have its valve element rotatably mounted within the valve housing so that the element may be simply removed without the need for tools.

A further object of the invention is that the fittings on the box can be assembled without the need of any tools and/or bolts and nuts.

BRIEF DESCRIPTION OF THE DRAWINGS

FIG. 3 is a vertical cross-sectional view of the meter box taken along reference line 3—3 of FIG. 1.

FIG. 4 is a detailed view of the cover or top locking mechanism.

DETAILED DESCRIPTION OF THE DRAWINGS

General Description

Figure 1:
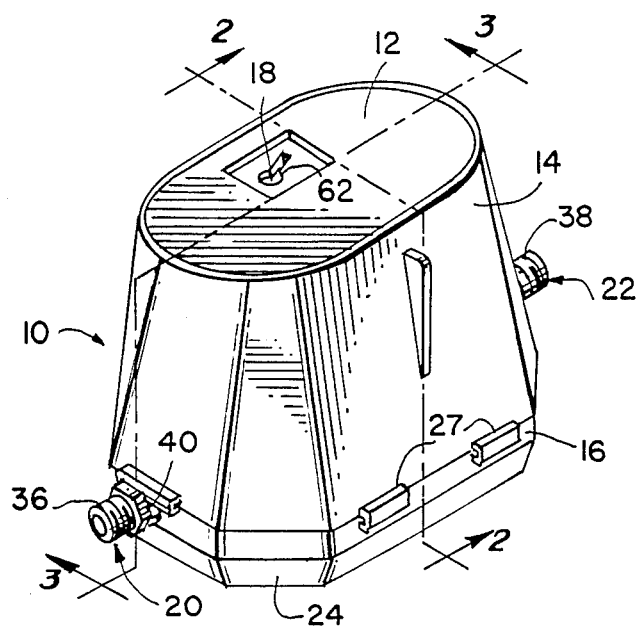
FIG. 1 is a perspective view of the assembled meter box of the present invention.

Referring to FIG. 1, a meter box embodying the present invention is shown generally at 10. Meter box 10 comprises three main components, a lid or top or cover 12, a middle portion or collar 14, and a bottom section or tray 16. Lid 12 has an oval shape, collar 14 has a transition from an oval to a polygonal or more particularly an octagonal shape, and tray 16 which has a polygonal shape, or, more particularly, octagonal.

Lid 12 serves as a cover for collar 14 and tray 16, and the three parts may be removably secured together without the need for any tools to form a box for the meter 25. In order to take the meter box apart no tools are needed except for the removal of lid 12 which requires a special key-like tool as discussed in more detail below. Lid 12 includes a lock-in mechanism, also described in more detail below, which operates through the use of a key through a keyhole 18 in the lid. Collar 14 similarly has a polygonal or other suitable shape designed to coincide with that of lid 12. It is tapered so that its narrow portion is at its top and its wider portion at its bottom.

The Tray

Figure 2:
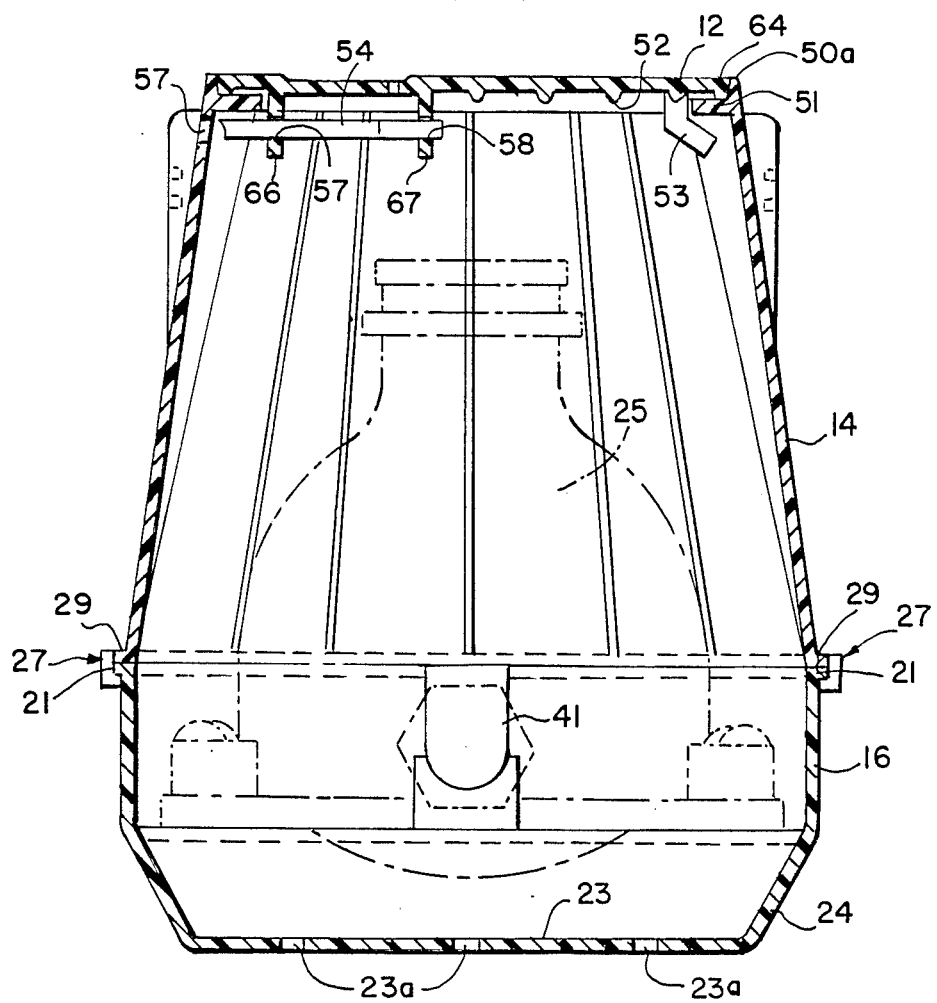
FIG. 2 is a vertical cross-sectional view of the meter box taken along reference line 2—2 of FIG. 1.

The tray 16 has the octagonal shape shown in FIG. 1 and is formed with a lip 21 extending outwardly therefrom around its entire periphery. As shown in FIGS. 2 and 3, the tray is formed with a relatively flat bottom 23 having a plurality of drain holes 23a and outwardly angled sides 24. At the inlet and outlet ends, the sides 24 are formed with outwardly directed ledges 24a and 24b upon each of which is formed vertically standing rims 42a and 42b within which U-shaped openings 40 and 41 respectively are formed.

Any suitable fluid meter 25, such as for water or gas, can be installed in box 10. Inlet and outlet valves 20 and 22 with respective valve fittings 36 and 38 pass through the U-shaped openings 40 and 41 in the rims 42a and 42b, respectively, at the ends of the tray and are therefore partially within the meter box and partially outside of the meter box. On the outside of the box, the fittings are provided with the removable connections 28 and 30 for connecting to copper pipe tubing, plastic pipe tubing or any other pipe tubing 31. The external surface of fitting 36 is curved concavely and the matching surface of connector 31 has a cooperating concavely curved surface which meet when the connector is threaded onto the fitting. With such arrangement a pipe of copper or other material used for conveying fluids is placed into the connector and the end is suitably expanded so that it will be in the form shown in FIG. 3. If desired, the end need not be expanded prior to insertion in connector, but as the connector is threaded onto the end of fitting 36, the curved surface of fitting 36 will engage the interior of the connector and force the pipe to assume the shape shown in FIG. 3. However this is performed, there is a fluid tight connection made in a simple manner and with assurance that a good seal will be provided.

As shown clearly in FIG. 2 at one end of the tray, the U-shaped opening 41 receives the fitting 38. The opposite end of the tray has a similar opening 40, shown best in FIG. 3, for fitting 36. Since this is done before the collar 14 is attached, the meter and the fittings may be lowered into the tray and the fittings each placed into and supported at the bottoms 40a and 41a of the U-shaped grooves 40 and 41 on the ends of the tray. At the same time, the fittings also each rest upon saddles 46 and 46a formed vertically from ledges 24a and 24b respectively. Each fitting, and thus the meter, is supported on at least two points on each end of the tray above the bottom 23. After the collar is placed onto the tray when the meter has been installed, each end has space within the U-shaped openings 40 and 41 above the place where the fittings extend outwardly of the tray.

The Collar and Releasable Connectors

Figure 13:
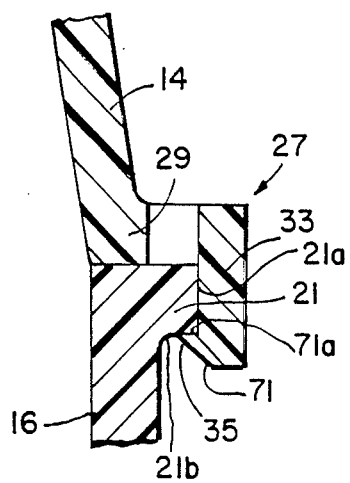
FIG. 13 is an enlarged sectional view through the lips of the tray and collar showing how they are secured together.
Figure 14:
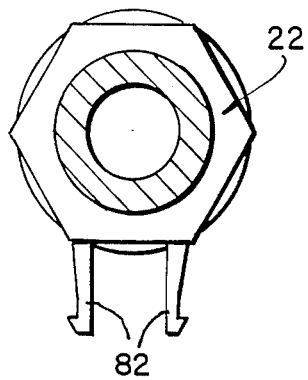
FIG. 14 is a sectional view through the inlet fitting.
Figure 15:
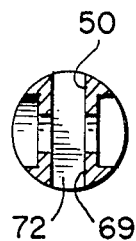
FIG. 15 is a sectional view through a portion of the valve element showing the rubber gasket which helps to stop the flow of fluids when the valve is in the closed position.
Figure 16A:
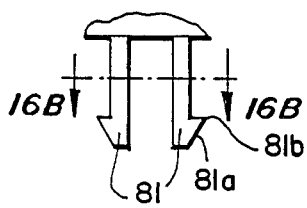
FIGS. 16a and 16b are detailed views of the snap connectors located on the fitting shown in FIG. 9.
Figure 16B:
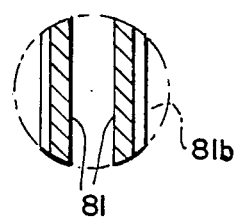
Figure 17:
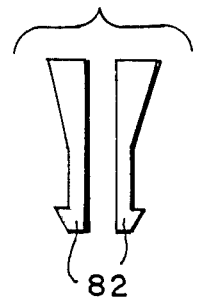
FIG. 17 is a detailed view of the snap connectors located on the fitting shown in FIG. 14.

Collar 14 is secured to tray 16 by releasable connectors in the form of snap tabs 27 and does not require the use of bolts or nuts such as has been required in the past. As best shown in FIGS. 1, 2 and 13, the collar is provided with a plurality of snap tabs 27 extending downwardly therefrom and projecting below the bottom surface of the collar which also has a lip collar 29 extending about the periphery thereof and matching the general size and shape of the tray lip 21 so that the collar rests on the tray with the two lips lying one above the other. When the collar 14 is placed onto the tray 16 and moved downwardly, spaced depending tabs 33 secured to collar lip 29, engage the upper outer corner of tray lip 21 at inclined surface 71 to cam the tabs outwardly. Continued downward movement of the collar 14 causes the tabs to be moved below the upper surface of lip tray 21. After moving further downwardly, the flexible tabs 33, are deformed outwardly so that the point 71a formed by each of the inclined surfaces 71 slides along the outer surface 21a of tray lip 21, to then reach the bottom of lip 21 on the tray. The tabs 33 then snap back to the locking position shown in FIG. 13 in which the locking tab 35, projecting inwardly from the bottom of the tab 33, engages the lower surface 21b of the lip 21 on the tray. The collar and the tray are thus removably secured together as shown in FIGS. 1 and 2.

Collar 14 may be made of lightweight material such as plastic, thus making the entire meter box 10 lighter than the cast iron boxes of the past. This will make for easier transport and installation.

The Lid and Locking Mechanism

Figure 5:
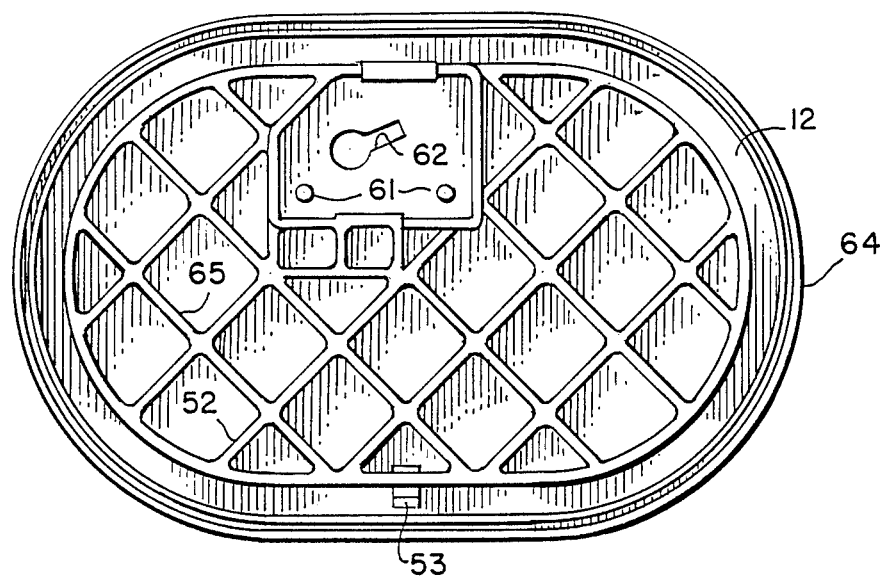
FIG. 5 is an elevational view of the lid or top of the meter box as seen from the bottom when in place.
Figure 6:
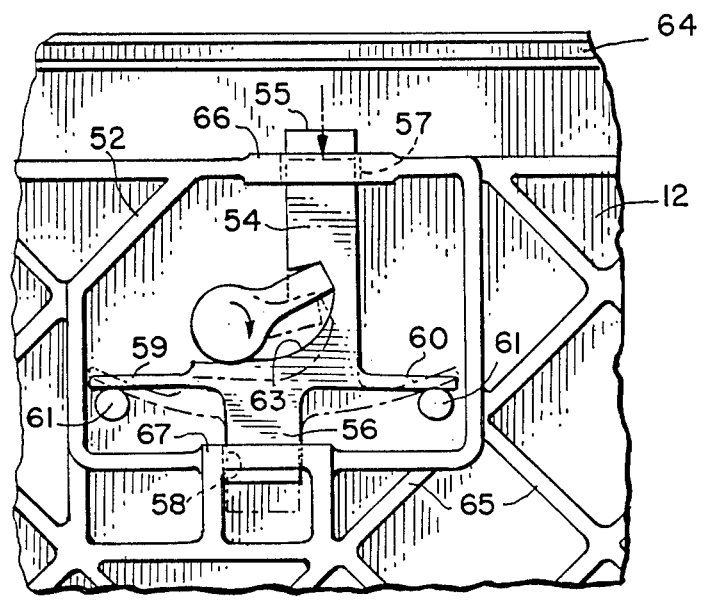
FIG. 6 is a detailed sectional view of the locking mechanism for the lid or top.
Figure 7:
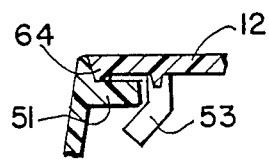
FIG. 7 is a detailed sectional view of the lid or top in place on the collar.

The lid 12 is removably secured on the collar 14 so that there is a single meter box 10 provided that locks together and protects the meter 5 from tampering, as well as the elements itself. Adjacent the top 50a of the collar, as shown in FIGS. 2 and 3, there is an inwardly extending, horizontal rim 51 around the entire periphery of the top 50a, for a purpose which will be explained. As best shown in FIGS. 3, 5 and 6, the lid 12 is formed as a waffle section 52 formed by reenforcing ribs 65 for strength and includes a locking mechanism shown in FIG. 6. The lid has a flange 64 projecting downwardly from inside the lid as may also be seen in FIGS. 2, 3 and 5–7. A slidable locking slip 54, shown in FIGS. 2 and 6, is provided with two integral and oppositely directed tongues 55 and 56, as best shown in FIG. 4, that project through two accommodating openings 57 and 58 formed in the depending locking flanges 66, 67 formed integrally with the underside of the lid 12 as shown in FIGS. 2 and 6. The locking slip 54 is formed of resilient and flexible material such as a plastic so the two deforming bars 59 and 60 formed integrally with the cruxiform shaped locking slip 54 may engage the rigid pins 61 fixed to and depending from the underside of the lid so as to engage the deforming bars 59 and 60.

The lid 12 also is provided with a key shaped opening 62 into which a locking and unlocking key (not shown) may be inserted when the meter box 10 is secured together. This key engages the grooved portion 63 of the locking slip 54 and the key is turned to move the locking slip downwardly as viewed in FIG. 6. The slip can move downwardly because the bars 59 and 60 are flexed and permit this movement as shown in dashed lines in FIG. 6. The resilient material forming the bars 59 and 60 assures that when the key is removed, the slip moves back into the locking position. When the locking slip 54 takes the dotted position in FIG. 6, the locking tongue 55 is moved so that it no longer is engaged under the collar rim 51, shown in FIG. 2, and may be pivoted off the collar about flange 64. The lid 12 also has one or more depending security fingers 53 which engage the lip on the side opposite the locking tongue so that when the locking tongue is in place the lid may not be removed from the collar.

Inlet valve 20 and outlet valve 22 are placed into position in the tray 16 as will be described in more detail hereinafter. They may be made by injection molding, structural foam molding or thermofoam formed. The tray 16 may be made of the same kind of plastic, resin, fiberglass, or any metal that can both produce these items and provide a very precise dimension between the two fittings so as to insure proper alignment. The manufacturing process with the integrated fittings is usually through an injection molding, structural foam molding, fiberglass or resin process.

The Meter

Inlet valve 20 and outlet valve 22 will be held in place by tray 16 so that the meter box 10 is not used only for the purpose of protecting meter 24, but also serves as a connecting piece between the exterior fluid (water) pipeline 31 and meter 25 itself. The valve fittings 36 and 38 will not move in any direction relative to the box and at the same time will maintain a perfect alignment between the fittings and meter 25 that will be installed later in the box with its integrated fittings.

The Expansion Mechanism

As shown in FIG. 3, an expansion mechanism 34 of known construction or of the construction disclosed in the copending application of Jose Rivero-Olmedo, Ser. No. 816,903 filed Jan. 8, 1986, for Expansion Mechanism for Meter Box or Meter Yoke, and is positioned between and secured to inlet valve 20 and meter 25 and the other end of the meter is connected to outlet connection 22. The expansion mechanism makes a secure seal between the inlet valve connection and the outlet connection fitting. At the outer ends of the fittings are connecting devices 36 and 38 designed so that the unit can be connected to any form of piping 31 available in the marketplace.

The Valves

Figure 8:
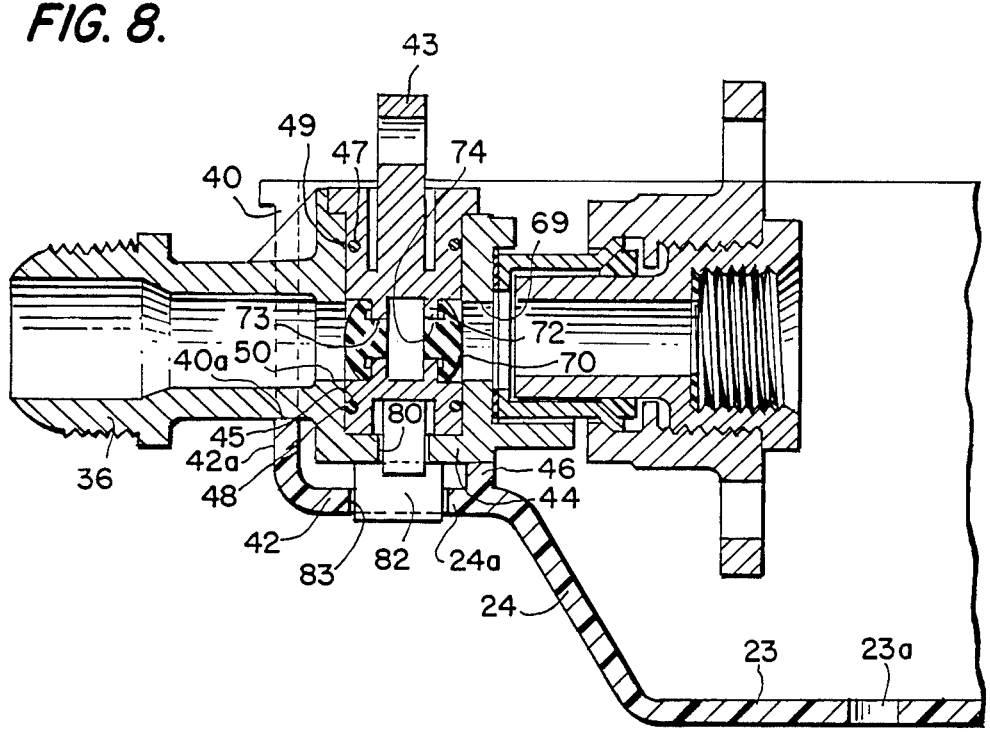
FIG. 8 is an enlarged sectional view similar to FIG. 3 but only showing the inlet valve and fitting.
Figure 9:
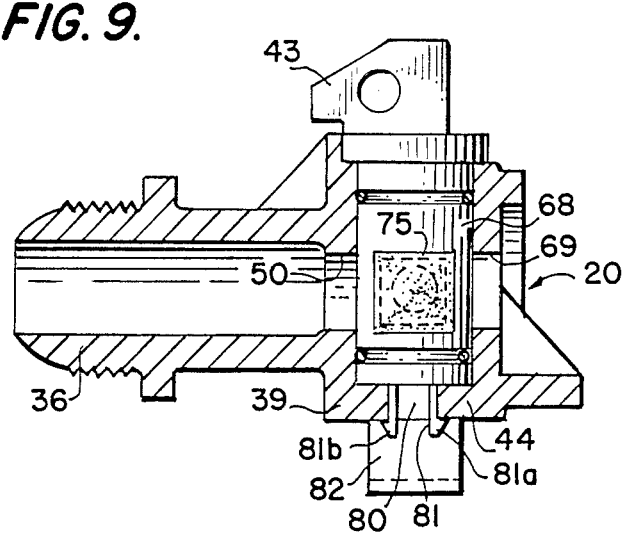
FIG. 9 is an enlarged sectional view similar to FIG. 3 but only showing the inlet fitting in section with the valve element in elevation.
Figure 11:
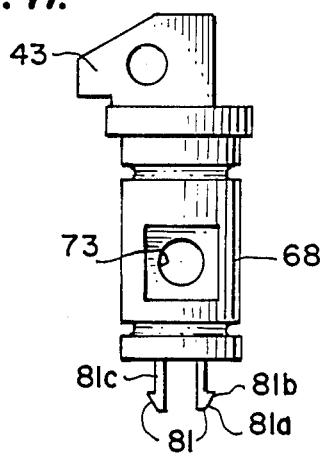
FIG. 11 is an elevational view of the valve element.

The inlet valve 20 includes a valve housing 39 which has a vertically oriented, cylindrical opening therein and into which the valve element 68 is located. As shown in FIGS. 8 and 9, the valve housing includes a generally flat bottom 44 which cooperates with a saddle 46 formed into the ledge 24a of the tray for supporting the bottom of the valve housing and at the same time this serves to keep the valve, and thus the meter, from engaging the bottom 23 of the tray.

The valve element 68 is basically cylindrical so that it may be rotated within valve housing 39 thereby to open and close the inlet to the meter by permitting or preventing fluid flow. The opening and closing is performed when the valve is rotated by turning the handle 43 connected to the top of the valve element 68. The element has two grooves 48 and 49 into which 0-rings 45 and 47 are placed to form a fluid tight seal between the element and the housing so that the fluid will not leak out of the valve. There is also an additional mushroom shaped rubber gasket 70 which will prevent the fluid from leaking. The housing 39 has openings providing an inlet 50 and an outlet 69 to the valve. Inlet 50 communicates with the fluid entrance to the fitting while outlet 69 communicates with the fluid exit to the valve housing and fitting.

Figure 12:
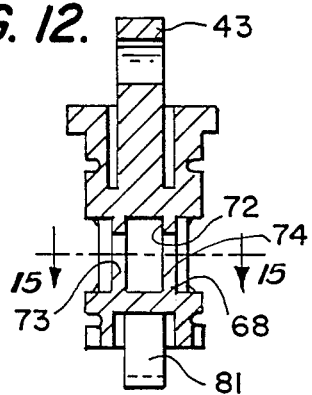
FIG. 12 is a sectional view through the valve element.
Figure 18A:
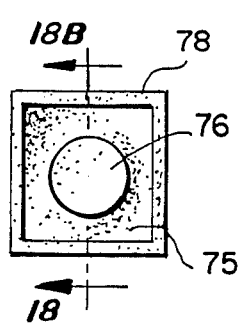
FIGS. 18a and 18b are sectional views through the gasket which is located in the valve element.
Figure 18B:
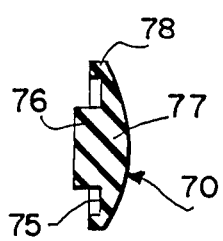

The valve element also has an opening 72 therethrough which, in one angular position of the element permits fluid to flow through the valve and in another position stops such fluid flow. There are also openings 73 and 74 through the sides of the valves as shown in FIG. 12, which have rubber gaskets 70 in them. Details of the gaskets are shown in FIGS. 18A and 18B, which show that the gaskets fit into the openings and seal them with respect to the valve housing. The external periphery of the gaskets are square as shown in FIG. 18A and includes a cylindrical central mounting section 76 which fits into the openings 73 and 74, and there is a spherically shaped head 77 on each of the gaskets that is arcuate in the center and then transitions into the square outside shape of the gasket. There is a flange 78 around the periphery of the square gasket that assures proper placement of the gasket so that it is not placed too far into the openings 73 and 74 in the valve element. As the valve element is turned from the position in which opening 72 is aligned with the inlet and outlet for maximum flow and into the position in which the opening 73 is aligned with the inlet, the gasket contacts the inside of the housing 44 around the area surrounding the opening 73 and thereby assures a proper seal.

In the bottom of the valve housing there is a circular opening 80 through which fit a pair of extensions 81 by being pressed together and then expanding when released (see FIGS. 9, 11, 12 and 16). When released they return back to their normal position. The extensions have pointed camming sides 81a including side hooks 81b. These extensions 81 are forced inwardly toward one another when being inserted downwardly into the housing 44 by pressure along these camming sides. After the side hooks 81b of the projections 81 are past the opening 80, the extensions 81 expand back to their normal position engaging the periphery of the opening 80 and permit rotation of the valve element. The shape of these extensions on the outer edges 81c are arcuate so that when in place they permit rotation of the valve element within the valve housing 44 for permitting adjustment of the valve by rotating it. This permits easy assembly of the valve elements as well as allowing taking the valve apart for maintenance without the need for tools.

In addition, the valve housing itself (FIG. 9) has extensions 82 projecting downwardly therefrom and which engage into opening 83 in the tray when the valve housing is placed into the tray. The extensions are cammed toward one another as downward pressure is applied to the housing and when the pointed ends pass the bottom of the tray, the extensions spring back to their normal position separated from each other. When it is desired to remove the valve housing for maintenance or replacement the extensions may be moved toward one another and then removed from the tray without the use of or need for tools.

Figure 10:
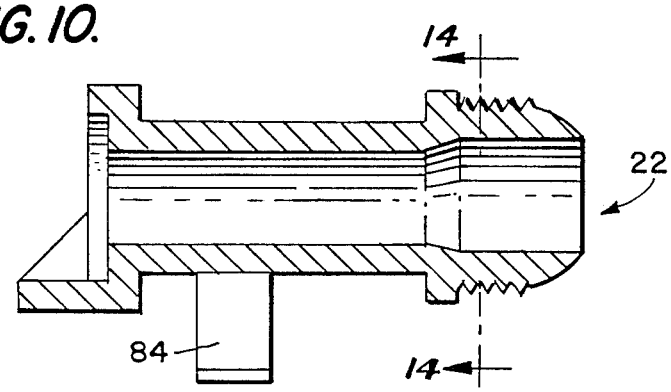
FIG. 10 is an enlarged sectional view similar to FIG. 3 but only showing the outlet fitting.

As shown in FIG. 10, the outlet 22 also has extensions 84 similar to extensions 81 on the valve housing which fit into openings 87 in the bottom of the tray. The mounting is otherwise similar to the mounting of the valve housings.

In view of the foregoing description, it is believed that the objects of the invention have been attained and that the invention should be limited solely and exclusively in scope by the following claims in which,

I claim:

1. A meter box, comprising:
    a bottom tray having a floor and at least one side wall connected to the floor, said side wall having a first lip extending outwardly;
    an upwardly extending collar releasably connected to said tray and extending above the intended location of the upper end of the meter to be housed in said box, said collar having a second lip extending outwardly therefrom cooperating with said first lip;

a lid releasably connected to the upper end of said collar;

snap fastening means for releasably connecting said first lip of said tray with said second lip of said collar;

means for releasably connecting said lip with said collar, whereby a meter box which may be disassembled to gain access to or replace the meter is provided;

inlet and outlet fittings for connection to a meter and located in opposite ends of said tray; and means mounting said fittings for positioning above the floor of said tray and at a location to be connected to said meter.

2. A meter box as defined in claim 1, including saddles extending from the floor of said tray to support the fittings above the floor of the tray.

3. A meter box as defined in claim 2, including U-shaped openings in the ends of said tray for the fittings to be positioned and maintained above the floor and in alignment with said saddles.

4. A meter box as defined in claim 3, including connectors threadedly connected to the ends of said fittings to connect the meter with a source of inlet fluid and a fluid outlet, said connectors having a curved surface against which a source of outlet and inlet fluid may be introduced from a pipe which is located in said connector and fitted to the curved surface thereof, and the outer end of each fitting having a curved surface which matches the curved surfaces on the connectors and which engage together to releasably hold the external pipe in position between said curved surfaces in a fluid tight manner.

5. A meter box as defined in claim 1, wherein said means for releasably connecting said lid and said collar includes a locking bar slidably engaged on the lid and normally biased into a position in which the bar is located under a projection on the lid so that the lid may not be lifted, there being a hook on the side of the lid opposite the locking bar so that the lid may not be removed from the collar unless the locking bar is moved.

6. A meter box as defined in claim 5 wherein the lid has a key shaped opening and the locking bar is located below the upper surface of the lid and positioned above the locking bar whereby access to move the locking bar to unlock it i only available when a key shaped implement which matches the shape of the key hole is used.

7. A meter box as defined in claim 1 wherein at least one of the fittings includes a valve which includes:

a valve housing located to interrupt the fitting so that fluid has to pass through said fitting to move into or out of said fitting, a valve element located in said housing and rotatable therein to allow fluid to selectively pass through said fitting in one position and to prevent fluid from passing through the fitting in another position of the valve.

8. A meter box as defined in claim 7, wherein the housing has a circular opening in the bottom thereof, and the valve element has two flexible, resilient projections extending from the bottom thereof and which project downwardly beyond the bottom of the housing and fit within the opening so that when the projections are passed through the opening the valve element may not be removed from the housing.

9. A meter box as defined in claim 8, wherein the projections move toward one another when being inserted through said opening and spring back to their normal position after clearing the bottom of the housing whereby the valve element is releasably and rotatably secured within the housing.

10. A meter box as defined in claim 9, wherein the valve element has a horizontal opening therethrough as a diameter of the element so that in one position of the valve element fluid can flow from one side of the valve to the other through said opening and in another position thereof fluid may not flow from one side of the valve to the other side.

11. A meter box as defined in claim 1, wherein said snap fastening means comprises a plurality of snap tabs.

12. A meter box as defined in claim 11, wherein said plurality of snap tabs extend downwardly from said collar with each snap tab having an inclined surface whereby the inclined surface slides along an outer surface of said first lip as said tab deforms outwardly while said collar is being lowered onto said tray, and then snaps back to a locking position when said collar is fully lowered onto said tray.

13. A meter box as defined in claim 1, wherein at least one of said fittings is provided with securing means extending downwardly therefrom for engaging with an opening in said tray for securing said fitting to said tray.

14. A meter box as defined in claim 13, wherein said securing means includes a pair of extensions each having pointed ends whereby said extensions are cammed toward one another as downward pressure is applied to said fitting, and spring back as the pointed ends exit through the opening in said tray.

15. A meter box as defined in claim 2, wherein at least one of said fitting is provided with securing means cooperating with a respective saddle for securing said fitting from relative movement within the meter box.

16. A meter box as defined in claim 15, wherein said securing means includes a pair of extensions each having pointed ends whereby said extensions are cammed toward one another as downward pressure is applied to said fitting, and spring back as the pointed ends exit through the opening in said tray.

* * * * *